United States Patent
Yamamoto

(10) Patent No.: US 8,399,369 B2
(45) Date of Patent: Mar. 19, 2013

(54) OPTICAL GLASS AND OPTICAL ELEMENT

(75) Inventor: Yoshinori Yamamoto, Saitama (JP)

(73) Assignee: Sumita Optical Glass, Inc., Saitama (JP)

( * ) Notice: Subject to any disclaimer, the term of this patent is extended or adjusted under 35 U.S.C. 154(b) by 86 days.

(21) Appl. No.: 12/928,951

(22) Filed: Dec. 22, 2010

(65) Prior Publication Data

US 2011/0160032 A1    Jun. 30, 2011

(30) Foreign Application Priority Data

Dec. 25, 2009 (JP) .................. 2009-296213

(51) Int. Cl.
*C03C 3/14*    (2006.01)
*C03C 3/068*    (2006.01)

(52) U.S. Cl. ............... 501/49; 501/51; 501/52; 501/77; 501/78

(58) Field of Classification Search .............. 501/49, 501/50, 51, 77, 78
See application file for complete search history.

(56) References Cited

U.S. PATENT DOCUMENTS

| | | | | |
|---|---|---|---|---|
| 5,733,828 A | * | 3/1998 | Usui et al. ................. | 501/17 |
| 7,291,573 B2 | * | 11/2007 | Ide .................. | 501/50 |
| 7,407,902 B2 | * | 8/2008 | Hasegawa et al. .............. | 501/15 |
| 7,943,540 B2 | * | 5/2011 | Yamamoto ................. | 501/50 |
| 8,058,196 B2 | * | 11/2011 | Nagaoka et al. ............... | 501/77 |
| 2008/0096753 A1 | * | 4/2008 | Yamamoto ................. | 501/42 |
| 2011/0303883 A1 | * | 12/2011 | Ishihara .................. | 252/512 |
| 2012/0065051 A1 | * | 3/2012 | Matano et al. ................. | 501/42 |

FOREIGN PATENT DOCUMENTS

| | | |
|---|---|---|
| EP | 2 161 245 | 3/2010 |
| JP | 11-317561 | * 11/1999 |
| JP | 2002-201039 | 7/2002 |
| JP | 2006-327926 | 12/2006 |
| JP | 2007-099606 | 4/2007 |
| JP | 2007-106625 | 4/2007 |
| JP | 2009221040 | * 10/2009 |
| JP | 2009-280429 | 12/2009 |
| JP | 201059012 | * 3/2010 |

OTHER PUBLICATIONS

Extended European Search Report dated Apr. 13, 2011.

* cited by examiner

*Primary Examiner* — Karl Group
(74) *Attorney, Agent, or Firm* — Farjami & Farjami LLP

(57) ABSTRACT

An object of the present invention is to provide optical glass having improved glass-devitrification resistance and moldability without causing reduction in refractive index, and also provide an optical element using the optical glass as a raw material. Specifically, the present invention provides an optical glass containing components of, by mol %: $B_2O_3$: over 60% through 75%; $Bi_2O_3$: 24% to 39%; $La_2O_3$: 7% or lower; $Gd_2O_3$: 7% or lower; and $ZrO_2$: 7% or lower.

16 Claims, No Drawings

OPTICAL GLASS AND OPTICAL ELEMENT

This application is based on and claims priority from foreign application Serial No. 2009-296213, filed on Dec. 25, 2009, in Japan.

BACKGROUND OF THE INVENTION

1. Field of the Invention

The present invention relates to optical glass, and in particular, to optical glass having a relatively high refractive index and excellent devitrification resistance. The present invention also relates to an optical element using the optical glass described above as a raw material.

2. Description of the Related Art

In association with the recent spread and development of digital optical devices, there has been a demand for an optical lens of smaller size enabling higher performances. In order to meet this demand, use of an aspherical lens obtained through precision press molding is essential in optical design. Optical glass for use in such an aspherical lens as described above must have as high a refractive index (nd) as possible.

In response to these needs, optical glass containing $Bi_2O_3$ at a high concentration has been actively developed in recent years.

For example, as optical glass having a relatively high refractive index, Japanese Patent Application Laid-open No. 2006-327926 proposes optical glass containing $Bi_2O_3$ by 25 to 80 mol %, Japanese Patent Application Laid-open No. 2007-106625 proposes optical glass containing $Bi_2O_3$ by 10 mass % to 90 mass % (inclusive of 10 mass % and exclusive of 90 mass %), and Japanese Patent Application Laid-open No. 2007-099606 also proposes optical glass containing $Bi_2O_3$ by 10 mass % to 90 mass % (inclusive of 10 mass % and exclusive of 90 mass %).

Further, Japanese Patent Application Laid-open No. 2002-201039 proposes a high refractive index glass for press molding, which substantially contains $Bi_2O_3$ at a concentration of 25 to 70% in mol % with respect to oxides.

However, none of the optical glasses disclosed in the aforementioned references has sufficient stability and moldability.

SUMMARY OF THE INVENTION

The present invention aims at advantageously solving the problems described above and an object thereof is to provide optical glass having improved glass-devitrification resistance without causing decrease in refractive index, and also provide an optical element using the optical glass as a raw material.

The present inventors investigated the reasons why the prior art techniques disclosed in the aforementioned references fail to obtain satisfactory glass devitrification resistance. As a result, the present inventors have made following discoveries.

(1) The optical glasses disclosed in 2006-327926, 2007-106625 and 2007-099606 require a large amount of $Bi_2O_3$ and thus the total contents of $SiO_2$ and $B_2O_3$, for example, have to be reduced to 60% or lower in mol % accordingly, which causes a problem in terms of devitrification resistance of glass.

Therefore, it is desirable that glass contains $B_2O_3$ at a content exceeding 60% from the viewpoint of maintaining good devitrification resistance of the glass.

However, in a case where glass contains a large amount of $B_2O_3$ at a content exceeding 60% of $B_2O_3$, there arises again a concern of decrease in the refractive index.

In view of this, the inventors made a keen study to solve the problem described above and found out that, even in glass of which $B_2O_3$ content exceeds 60 mol %, the aforementioned object can be achieved by adding $La_2O_3$, $Gd_2O_3$ and $ZrO_2$ together to the glass.

(2) It should be noted that the optical glass disclosed in No. 2002-201039 fails to contain $La_2O_3$, $Gd_2O_3$ and $ZrO_2$, and leaves the problem of glass devitrification unsolved.

In view of these facts, the present inventors have discovered that glass preferably contains $La_2O_3$, $Gd_2O_3$ and $ZrO_2$, together with other components from the viewpoint of achieving good devitrification resistance of the glass.

The present invention has been completed as a result of various studies on the basis of the discoveries described above.

Specifically, optical glass of the present invention is a $Bi_2O_3$-based optical glass containing $B_2O_3$ by 60 mol % or more, characteristically having a compositional feature that the optical glass contains $La_2O_3$, $Gd_2O_3$ and $ZrO_2$ at appropriate contents, respectively, and lacks any alkali metal oxide, alkaline-earth metal oxide and ZnO.

Hereinbelow, the present invention will be described.

1. An optical glass, comprising by mol %:
   $B_2O_3$: 60% to 75% (exclusive of 60% and inclusive of 75%);
   $Bi_2O_3$: 24% to 39% (inclusive of 24% and 39%);
   $La_2O_3$: 7% or lower;
   $Gd_2O_3$: 7% or lower; and,
   $ZrO_2$: 7% or lower.

2. The optical glass according to 1 above, wherein the total content of $La_2O_3$, $Gd_2O_3$ and $ZrO_2$ is in the range of 0.3 to 10%.

3. The optical glass according to 1 or 2 above, further comprising by mol % at least one or two types of components selected from the group consisting of:
   $SiO_2$: 5% or lower;
   $GeO_2$: 5% or lower;
   $Ta_2O_5$: 5% or lower;
   $Nb_2O_5$: 5% or lower;
   $WO_3$: 5% or lower; and,
   $Sb_2O_3$: 1% or lower.

4. The optical glass according to any one of 1 to 3 above, wherein the optical glass has: a glass transformation point (Tg) of 500° C. or lower; refractive index (nd) of 1.85 or larger; and; an optical constant represented by Abbe number (vd) in the range of 15.0 to 30.0.

5. An optical element formed by the optical glass according to any one of 1 to 4 above.

Effect of the Invention

According to the present invention, it is possible to obtain optical glass in which glass-devitrification resistance and moldability are both improved without causing the reduction in refractive index.

Further, according to the present invention, it is possible to obtain an optical element having excellent devitrification resistance of glass by using the optical glass described above as a raw material.

DESCRIPTION OF THE PREFERRED EMBODIMENTS

Hereinbelow, the present invention will be described in details.

First, the glass compositions and the content ranges thereof described above, of the present invention, will be described. In the present specification, the symbol "%" concerning components represents "mol %."

[$B_2O_3$: 60% to 75% (exclusive of 60% and inclusive of 75%)]

In the present invention, $B_2O_3$ is a particularly important component. A network structure can be formed in glass by adding $B_2O_3$ thereto, so that glass having improved devitrification resistance can be obtained with hardly causing the refractive index to decrease. Further, melting properties of glass can be improved and the melting temperature thereof can be lowered by adding $B_2O_3$, whereby the glass is prevented from being colored and transmittance in the range of visible light can be enhanced. In a case where the content of $B_2O_3$ is 60% or less, devitrification resistance may deteriorate. In a case where the content of $B_2O_3$ exceeds 75%, the desired refractive index cannot be obtained. Therefore, the content of $B_2O_3$ is to be set in the range of 60% to 75% (exclusive of 60% and inclusive of 75%). The content of $B_2O_3$ is preferably in the range of 60.1% to 74.5% (inclusive of 60.1% and 74.5%).

[$Bi_2O_3$: 24% to 39% (inclusive of 24% and 39%)]

In the present invention, $Bi_2O_3$ is a very important component which significantly contributes to enhancing refractive index and degree of dispersion of the glass and also causes an effect of lowering a glass transformation point (Tg) of the glass.

In a case where the content of $Bi_2O_3$ is less than 24%, a desired high refractive index and high degree of dispersion cannot be obtained. In a case where the content of $Bi_2O_3$ exceeds 39%, the devitrification resistance deteriorates, possibly making it difficult to achieve satisfactory vitrification. Therefore, the content of $Bi_2O_3$ is to be set in the range of 24% to 39% (inclusive of 24% and 39%). The content of $Bi_2O_3$ is preferably in the range of 24.5% to 38.5% (inclusive of 24.5% and 38.5%).

[$La_2O_3$: 7% or less (exclusive of 0%)]

In the present invention, $La_2O_3$ is an important component. In the present invention, the glass contains $B_2O_3$ at a content exceeding 60% in order to ensure good devitrification resistance as described above and the content of $Bi_2O_3$ decreases in an inversely proportional manner, which generates a concern of decrease in the refractive index of the glass. Addition of $La_2O_3$ eliminates this concern. Decrease in the refractive index can be effectively suppressed by making the glass contain $La_2O_3$ in combination with $Gd_2O_3$ and $ZrO_2$ described later. Specifically, $La_2O_3$ effectively contributes to enhancing refractive index of the glass and causes a significant effect of improving chemical durability and devitrification resistance. In a case where the content of $La_2O_3$ exceeds 7%, melting properties and devitrification resistance of the glass deteriorate, and the glass transformation point (Tg) may rise. Therefore, the content of $La_2O_3$ is to be set at 7% or lower, and preferably, at 6% or lower. In order to sufficiently obtain the aforementioned effect, it is preferable that the glass contains $La_2O_3$ at a content 0.2% or more.

[$Gd_2O_3$: 7% or less (exclusive 0%)]

As described above, together with $La_2O_3$ and $ZrO_2$, $Gd_2O_3$ is an important component for suppressing decrease in the refractive index. Further, $Gd_2O_3$ causes, when it is contained in combination with $La_2O_3$ in glass, an effect of enhancing devitrification resistance of the glass. In a case where the content of $Gd_2O_3$ exceeds 7%, melting properties and devitrification resistance of glass may deteriorate. Therefore, the content of $Gd_2O_3$ is to be set at 7% or lower, and preferably, at 6% or lower. In order to sufficiently obtain the aforementioned effect, it is preferable that glass contains $Gd_2O_3$ at a content of 0.2% or more.

[$ZrO_2$: 7% or less (exclusive of 0%)]

Similarly, $ZrO_2$ is an important component for suppressing decrease in the refractive index. Further, $ZrO_2$ has an effect of enhancing devitrification resistance and improving chemical durability of glass. In a case where the content of $ZrO_2$ exceeds 7%, melting properties and devitrification resistance of the glass may deteriorate. Therefore, the content of $ZrO_2$ is to be set at 7% or lower, and preferably, at 6% or lower. In order to sufficiently obtain the aforementioned effect, it is preferable that the glass contains $ZrO_2$ at a content of 0.1% or more.

In a case where the total amount of $La_2O_3$, $Gd_2O_3$ and $ZrO_2$ is less than 0.3%, for example, the effects of improving refractive index and devitrification resistance of glass are weak. In a case where the total amount of $La_2O_3$, $Gd_2O_3$ and $ZrO_2$ exceeds 10%, deterioration of the devitrification resistance reaches an unignorable level. Therefore, the total amount of $La_2O_3$, $Gd_2O_3$ and $ZrO_2$ is preferably in the range of 0.3 to 10%, and more preferably in a range of 0.5 to 9%.

In the present invention, it is possible that the optical glass further contains components described below in addition to the essential components thereof described above depending on applications.

[$SiO_2$: 5% or less (exclusive of 0%)]

$SiO_2$ is an effective component for forming a network structure in glass to improve devitrification resistance thereof.

In a case where the content of $SiO_2$ exceeds 5%, the melting temperature may rise, resulting in the glass being thickly colored. Therefore, it is desirable that glass contains $SiO_2$ at a content of 5% or lower, and preferably, 4% or lower.

[$GeO_2$: 5% or less (exclusive of 0%)]

Similar to $SiO_2$, $GeO_2$ is an effective component for forming a network structure in glass and improving devitrification resistance of the glass.

In a case where the content of $GeO_2$ exceeds 5%, such a high content of $GeO_2$ results in too strong reducibility and the glass may be thickly colored. Therefore, the glass contains $GeO_2$ preferably at a content of 5% or lower and more preferably at a content of 4% or lower.

[$Ta_2O_5$: 5% or less (excluding 0%)]

$Ta_2O_5$ is an effective component for not only enhancing the refractive index but also improving the devitrification resistance of glass.

In a case where the content of $Ta_2O_5$ exceeds 5%, the devitrification resistance of the glass deteriorates. Therefore, the glass contains $Ta_2O_5$ preferably at a content of 5% or lower and more preferably at a content of 4% or lower.

[$Nb_2O_5$: 5% or less (exclusive of 0%)]

$Nb_2O_5$ is an effective component capable of enhancing the refractive index of glass.

In a case where the content of $Nb_2O_5$ exceeds 5%, melting properties and devitrification resistance of the glass may deteriorate. Therefore, the glass contains $Nb_2O_5$ preferably at a content of 5% or lower and more preferably at a content of 4% or lower.

[$WO_3$: 5% or less (exclusive of 0%)]

$WO_3$ is an effective component capable of enhancing the refractive index of glass.

In a case where the content of $WO_3$ exceeds 5%, the devitrification resistance of glass may deteriorate. Therefore, the glass contains $WO_3$ preferably at a content of 5% or lower and more preferably at a content of 4% or lower.

[Sb$_2$O$_3$: 1% or less (exclusive of 0%)]

Sb$_2$O$_3$ may be added in order to improve the coloration or defoaming of glass. An industrially known defoaming component such as Sb$_2$O$_3$ can cause a sufficient defoaming effect at a content of 1% or lower.

Incidentally, in the conventional optical glass, an alkali metal oxide (Li$_2$O, Na$_2$O and K$_2$O) is added thereto in order to obtain an effect of improving the melting properties and lowering the glass transformation point (Tg) of the glass. However, it has been revealed by a study made by the present inventors that such an alkali metal oxide as described above thus added rather cuts the network of the glass off and weakens bonding in the glass, thereby causing devitrification resistance and chemical durability to deteriorate and volatilization during press molding to be accelerated. In view of this fact, the optical glass of the present invention does not contain such an alkali metal oxide as described above.

In the present invention, although an alkali metal oxide is not added, neither deterioration of devitrification resistance and melting properties nor rise of the glass transformation point occurs because the optical glass contains Bi$_2$O$_3$, in particular, at a relatively large content.

Further, although an alkaline-earth metal oxide (MgO, CaO, SrO and BaO) and ZnO are effective components for improving melting properties, devitrification resistance and chemical durability, these alkaline-earth metal oxides are not added to the optical glass of the present invention because it has been revealed that these alkaline-earth metal oxides do not contribute to obtaining a desired refractive index. Regarding the melting properties and the like, these characteristics can be obtained at sufficiently satisfactory levels by appropriately adjusting the components of the present invention, as described above.

According to the optical glass having the compositions and the ranges thereof as described above, of the present invention, following physical properties can be obtained: the glass transformation point (Tg) is 500° C. or lower, preferably in the range of 400 to 490° C.; the refractive index (nd) is 1.85 or more, preferably in the range of 1.854 to 2.031; and the optical constant represented by Abbe number (vd) is in the range of 15.0 to 30.0, preferably in the range of 20 to 27.

As described above, optical glass having satisfactorily high refractive index and excellent devitrification resistance can be produced by using the optical glass composition according to the present invention. By subjecting the optical glass to polish machining, it is possible to produce an optical element such as polishing perform, lens, prism and mirror. Further, as an application of the optical glass according to the present invention, a gob preform can be manufactured by directly dropping the optical glass in a molten state.

In the present specification, a "preform" represents a base material of a lens prior to mold forming, which is a piece of glass in a mirror-finish state. Optical elements of various shapes can be each produced by setting a polishing preform or a gob preform in a mold in a mirror-finish state, heating and softening the preform and then pressing it (precision molding).

Next, a preferable method of producing optical glass according to the present invention will be described.

The method of producing optical glass according to the present invention is not particularly limited, and any conventional production method is advantageously applicable thereto.

Specifically, each of an oxide, a hydroxide, a carbonate, a nitrate and the like corresponding to the respective components is weighed so as to have a predetermined content, and the weighed components are sufficiently mixed to obtain a glass raw material in a blended state. The glass raw material in a blended state is preferably charged into a platinum crucible or a gold crucible; melted at a temperature in the range of 800 to 1100° C. for one to 10 hours in an electric furnace; stirred at appropriate timings to make the melt uniform; defoamed; poured into a mold that has been preheated to an appropriated temperature; and gradually cooled inside the electric furnace.

Examples

The optical glass according to the present invention will be specifically described with reference to Examples and Comparative Examples hereinafter. The present invention is not limited to these Examples.

Each of Example optical glasses 1-20 and Comparative Example optical glasses 1-6 was obtained by: weighing the corresponding raw materials thereof such that the oxides respectively having the specified contents shown in Tables 1 and 2 totally weighed 100 g; mixing the raw materials well; charging the mixed raw material in a platinum crucible; melting the raw material at a temperature in the range of 800 to 1100° C. for one to two hours in an electric furnace; stirring the melt and subjecting it to further melting for one to two hours; stirring the melt at appropriate timings to make the melt uniform; defoaming the melt and pouring it into a mold that had been preheated to an appropriated temperature; and gradually cooling the mold in an electric furnace. The respective optical glasses were analyzed for measurement of the glass transformation point (Tg), refractive index (nd) and Abbe number (vd) and evaluation of devitrification resistance thereof.

Measurement of the glass transformation point (Tg), refractive index (nd) and Abbe number (vd) are made by the methods described in "JOGIS08-2003: Method of measuring thermal expansion of optical glass" and "JOGIS01-2003: Method of measuring the refractive index of optical glass" according to the Japan Optical Glass Industry Association Standards.

Evaluation of the devitrification resistance was made by melting the oxides shown in Tables 1 and 2 at a temperature in the range of 800 to 1100° C. for one to two hours; and stirring the melt to determining whether the melt was devitrified or not.

In the evaluation of the devitrification resistance, "○" represents that devitrification has not occurred in the melt until the end of mixing; "Δ" represents that the melt has somehow remained transparent, although it has acquired some opaqueness, at the end of stirring (i.e. the melt is still usable for production of optical glass); and "x" represents that devitrification and crystallization have occurred during stirring (i.e. the melt is unsuitable for production of optical glass).

TABLE 1

| mol % | Example Optical Glass 1 | Example Optical Glass 2 | Example Optical Glass 3 | Example Optical Glass 4 | Example Optical Glass 5 | Example Optical Glass 6 | Example Optical Glass 7 | Example Optical Glass 8 | Example Optical Glass 9 | Example Optical Glass 10 |
|---|---|---|---|---|---|---|---|---|---|---|
| B$_2$O$_3$ | 61.00 | 61.00 | 61.12 | 60.62 | 60.60 | 68.50 | 73.50 | 74.50 | 69.00 | 69.00 |
| Bi$_2$O$_3$ | 30.30 | 31.27 | 36.16 | 38.02 | 38.50 | 30.50 | 25.50 | 24.50 | 25.00 | 25.00 |
| La$_2$O$_3$ | 2.84 | 2.84 | 1.03 | 0.51 | 0.30 | 0.30 | 0.30 | 0.30 | 5.60 | 0.10 |
| Gd$_2$O$_3$ | 2.83 | 1.89 | 0.95 | 0.47 | 0.30 | 0.35 | 0.35 | 0.35 | 0.10 | 5.60 |

TABLE 1-continued

| mol % | | | | | | | | | | |
|---|---|---|---|---|---|---|---|---|---|---|
| $ZrO_2$ | 3.03 | 3.00 | 0.75 | 0.38 | 0.30 | 0.35 | 0.35 | 0.35 | 0.30 | 0.30 |
| $La_2O_3 + Gd_2O_3 + ZrO_2$ | 8.70 | 7.73 | 2.72 | 1.36 | 0.90 | 1.00 | 1.00 | 1.00 | 6.00 | 6.00 |
| $GeO_2$ | | | | | | | | | | |
| $SiO_2$ | | | | | | | | | | |
| $Ta_2O_5$ | | | | | | | | | | |
| $Nb_2O_5$ | | | | | | | | | | |
| $WO_3$ | | | | | | | | | | |
| $Sb_2O_3$ | | | | | | | | | | |
| Total | 100.00 | 100.00 | 100.00 | 100.00 | 100.00 | 100.00 | 100.00 | 100.00 | 100.00 | 100.00 |
| Tg (° C.) | 477 | 471 | 448 | 438 | 439 | 452 | 462 | 465 | 488 | 486 |
| nd | 1.971 | 1.976 | 2.004 | 2.016 | 2.020 | 1.928 | 1.867 | 1.854 | 1.899 | 1.896 |
| nd | 23.2 | 22.9 | 21.2 | 20.8 | 20.6 | 23.6 | 26.0 | 26.6 | 25.9 | 26.0 |
| Devitrification resistance | ○ | ○ | ○ | ○ | ○ | ○ | ○ | ○ | Δ | Δ |

| mol % | Example Optical Glass 11 | Example Optical Glass 12 | Example Optical Glass 13 | Example Optical Glass 14 | Example Optical Glass 15 | Example Optical Glass 16 | Example Optical Glass 17 | Example Optical Glass 18 | Example Optical Glass 19 | Example Optical Glass 20 |
|---|---|---|---|---|---|---|---|---|---|---|
| $B_2O_3$ | 60.10 | 69.00 | 61.12 | 62.00 | 65.40 | 65.00 | 65.00 | 68.00 | 65.50 | 70.43 |
| $Bi_2O_3$ | 39.40 | 25.00 | 35.66 | 31.56 | 31.00 | 31.00 | 31.00 | 28.00 | 31.00 | 28.47 |
| $La_2O_3$ | 0.20 | 0.10 | 1.03 | 2.05 | 0.10 | 0.30 | 0.30 | 0.40 | 0.20 | 0.30 |
| $Gd_2O_3$ | 0.10 | 0.10 | 0.95 | 1.89 | 0.10 | 0.20 | 0.20 | 0.30 | 0.20 | 0.35 |
| $ZrO_2$ | 0.20 | 5.80 | 0.75 | 1.50 | 0.40 | 0.30 | 0.30 | 0.30 | 0.10 | 0.35 |
| $La_2O_3 + Gd_2O_3 + ZrO_2$ | 0.50 | 6.00 | 2.72 | 5.44 | 0.60 | 0.80 | 0.80 | 1.00 | 0.50 | 1.00 |
| $GeO_2$ | | | | | | 3.20 | | | | |
| $SiO_2$ | | | | | | | 3.20 | | | |
| $Ta_2O_5$ | | | 0.50 | 1.00 | 3.00 | | | | | |
| $Nb_2O_5$ | | | | | | | | 3.00 | | |
| $WO_3$ | | | | | | | | | 3.00 | |
| $Sb_2O_3$ | | | | | | | | | | 0.10 |
| Total | 100.00 | 100.00 | 100.00 | 100.00 | 100.00 | 100.00 | 100.00 | 100.00 | 100.00 | 100.00 |
| Tg (° C.) | 428 | 469 | 449 | 469 | 460 | 451 | 452 | 460 | 452 | 455 |
| nd | 2.031 | 1.888 | 2.003 | 1.976 | 1.953 | 1.934 | 1.929 | 1.926 | 1.943 | 1.904 |
| nd | 20.3 | 25.6 | 21.4 | 22.7 | 22.9 | 23.4 | 23.5 | 23.4 | 22.5 | 24.6 |
| Devitrification resistance | Δ | Δ | Δ | Δ | Δ | ○ | ○ | Δ | Δ | ○ |

TABLE 2

| mol % | Comparative Example Optical Glass 1 | Comparative Example Optical Glass 2 | Comparative Example Optical Glass 3 | Comparative Example Optical Glass 4 | Comparative Example Optical Glass 5 | Comparative Example Optical Glass 6 |
|---|---|---|---|---|---|---|
| $B_2O_3$ | 61.00 | 61.00 | 59.00 | 75.50 | 28.50 | 34.96 |
| $Bi_2O_3$ | 39.00 | 28.40 | 32.30 | 23.50 | 42.70 | 15.00 |
| $La_2O_3$ | | | 3.54 | 2.84 | 0.30 | |
| $Gd_2O_3$ | | | 3.53 | 2.83 | 0.35 | |
| $ZrO_2$ | | | 3.53 | 3.03 | 0.35 | |
| $La_2O_3 + Gd_2O_3 + ZrO_2$ | | | 10.60 | 8.70 | 1.00 | |
| $GeO_2$ | | | | | | |
| $SiO_2$ | | | | | 21.60 | 10.00 |
| $Ta_2O_5$ | | | | | | |
| $Nb_2O_5$ | | | | | | |
| $WO_3$ | | | | | | |
| $Li_2O$ | | | | | | 15.00 |
| CaO | | | | | | |
| BaO | | | | | 7.20 | 25.00 |
| ZnO | | | | | | |
| $Sb_2O_3$ | | | | | | 0.04 |
| Total | 100.00 | 100.00 | 100.00 | 100.00 | 100.00 | 100.00 |
| Tg (° C.) | 432 | 485 | 468 | 468 | 406 | 388 |
| nd | 2.022 | 1.962 | 1.995 | 1.842 | 2.087 | 1.835 |
| nd | 20.4 | 23.9 | 22.3 | 27.1 | 17.9 | 26.5 |
| Devitrification resistance | X | X | X | X | X | X |

It was confirmed that each of the optical glasses of Examples 1-20 were excellent in glass transformation point (Tg), refractive index (nd), Abbe number (vd) and devitrification resistance.

Further, a predetermined amount of glass samples was cut out from each of the optical glasses of Examples 1-20 to manufacture several polishing preforms. The polishing preforms thus obtained were subjected to precision molding to obtain several types of lenses. These lenses exhibited favorable transferability, showing no problematic phenomenon in terms of moldability such as attachment of the glass to a mold, attachment of volatiles to the glass, etc. That is, optical glasses suitable for precision molding were obtained.

Comparative Example optical glass 1 contains $B_2O_3$ as a glass molding component at a content exceeding 60%, which composition may trigger an assumption that optical glass having high devitrification resistance will be obtained. However, in fact, the glass turned out to be very poor in devitrification resistance because it lacked the components such as $La_2O_3$, $Gd_2O_3$, $ZrO_2$ and the like. Comparative Example optical glass 2 satisfies the requirements of the present invention in terms of $B_2O_3$ and $Bi_2O_3$. However, the glass turned out to be poor in devitrification resistance because the total contents of $La_2O_3+Gd_2O_3+ZrO_2$ in the glass exceeded 10%.

Comparative Example optical glass 3 satisfies the requirements of the present invention in terms of $Bi_2O_3$, $La_2O_3$, $Gd_2O_3$ and $ZrO_2$. However, the glass had a problem in devitrification resistance because it contained $B_2O_3$ at a content less than 60%.

Comparative Example optical glass 4 does not satisfy the requirements of the present invention in terms of $B_2O_3$ and $Bi_2O_3$. Accordingly, the glass exhibited poor devitrification resistance and unsatisfactory refractive index (nd) of less than 1.85.

Comparative Example optical glass 5 exhibited very high refractive index (nd). However, the glass had a problem in devitrification resistance because it fails to satisfy all the requirements for the components of the present invention.

Comparative Example optical glass 6 had a problem in devitrification resistance because it fails to satisfy all the requirements for the components of the present invention. Further, the glass had a problem in terms of chemical durability, as well, because it contained a relatively large amount of $Li_2O$.

What is claimed is:

1. An optical glass, comprising by mol %:
   $B_2O_3$: 60% to 75% (exclusive of 60% and inclusive of 75%);
   $Bi_2O_3$: 24% to 39% (inclusive of 24% and 39%);
   $La_2O_3$: 7% or lower (exclusive 0%);
   $Gd_2O_3$: 7% or lower (exclusive 0%); and
   $ZrO_2$: 7% or lower (exclusive 0%).

2. The optical glass according to claim 1, wherein the total content of $La_2O_3$, $Gd_2O_3$ and $ZrO_2$ is in the range of 0.3 to 10%.

3. The optical glass according to claim 1, further comprising by mol % at least one component selected from the group consisting of:
   $SiO_2$: 5% or lower;
   $GeO_2$: 5% or lower;
   $Ta_2O_5$: 5% or lower;
   $Nb_2O_5$: 5% or lower;
   $WO_3$: 5% or lower; and,
   $Sb_2O_3$: 1% or lower.

4. The optical glass according to claim 2, further comprising by mol % at least one component selected from the group consisting of:
   $SiO_2$: 5% or lower;
   $GeO_2$: 5% or lower;
   $Ta_2O_5$: 5% or lower;
   $Nb_2O_5$: 5% or lower;
   $WO_3$: 5% or lower; and,
   $Sb_2O_3$: 1% or lower.

5. The optical glass according to claim 1, wherein the optical glass has: a glass transformation point (Tg) of 500° C. or lower; refractive index (nd) of 1.85 or larger; and; an optical constant represented by Abbe number (vd) in the range of 15.0 to 30.0.

6. The optical glass according to claim 2, wherein the optical glass has: a glass transformation point (Tg) of 500° C. or lower; refractive index (nd) of 1.85 or larger; and; an optical constant represented by Abbe number (vd) in the range of 15.0 to 30.0.

7. The optical glass according to claim 3, wherein the optical glass has: a glass transformation point (Tg) of 500° C. or lower; refractive index (nd) of 1.85 or larger; and; an optical constant represented by Abbe number (vd) in the range of 15.0 to 30.0.

8. The optical glass according to claim 4, wherein the optical glass has: a glass transformation point (Tg) of 500° C. or lower; refractive index (nd) of 1.85 or larger; and; an optical constant represented by Abbe number (vd) in the range of 15.0 to 30.0.

9. An optical element formed by the optical glass according to claim 1.

10. An optical element formed by the optical glass according to claim 2.

11. An optical element formed by the optical glass according to claim 3.

12. An optical element formed by the optical glass according to claim 4.

13. An optical element formed by the optical glass according to claim 5.

14. An optical element formed by the optical glass according to claim 6.

15. An optical element formed by the optical glass according to claim 7.

16. An optical element formed by the optical glass according to claim 8.

* * * * *